US011442495B2

(12) United States Patent
Sajja et al.

(10) Patent No.: US 11,442,495 B2
(45) Date of Patent: Sep. 13, 2022

(54) SEPARATE CLOCKING FOR COMPONENTS OF A GRAPHICS PROCESSING UNIT

(71) Applicant: ADVANCED MICRO DEVICES, INC., Santa Clara, CA (US)

(72) Inventors: Ranjith Kumar Sajja, Santa Clara, CA (US); Sreekanth Godey, Santa Clara, CA (US); Anirudh R. Acharya, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/032,701

(22) Filed: Sep. 25, 2020

(65) Prior Publication Data

US 2021/0278873 A1    Sep. 9, 2021

Related U.S. Application Data

(60) Provisional application No. 63/050,527, filed on Jul. 10, 2020, provisional application No. 62/985,985, filed on Mar. 6, 2020.

(51) Int. Cl.
*G06F 1/08* (2006.01)
*G06F 11/34* (2006.01)
*G06F 9/50* (2006.01)
*G06F 1/12* (2006.01)

(52) U.S. Cl.
CPC ............. *G06F 1/08* (2013.01); *G06F 1/12* (2013.01); *G06F 9/505* (2013.01); *G06F 11/3409* (2013.01)

(58) Field of Classification Search
CPC ... G06F 1/08; G06F 1/12; G06F 9/505; G06F 11/3409; G06F 1/04
See application file for complete search history.

(56) References Cited

U.S. PATENT DOCUMENTS

| | | | |
|---|---|---|---|
| 7,539,893 B1 * | 5/2009 | Ferguson | G01R 31/31718 714/6.1 |
| 9,875,516 B2 * | 1/2018 | Li | G09G 5/363 |
| 2005/0030320 A1 * | 2/2005 | Munshi | G06T 11/40 345/620 |
| 2008/0077818 A1 * | 3/2008 | Rauschmayer | G06F 1/3268 713/400 |

(Continued)

FOREIGN PATENT DOCUMENTS

KR    10-1723127 B1    4/2017

OTHER PUBLICATIONS

International Search Report and Written Opinion dated Jun. 25, 2021 for Application No. PCT/US2021/021046, 9 Pages.

*Primary Examiner* — Raymond N Phan

(57) ABSTRACT

Systems and methods related to controlling clock signals for clocking shader engines modules (SEs) and non-shader-engine modules (nSEs) of a graphics processing unit (GPU) are provided. One or more dividers receive a clock signal CLK and output a clock signal CLKA to the SEs and output a clock signal CLKB to the nSEs. The frequencies of CLKA and CLKB are independently selected based on sets of performance counter data monitored at the SEs and nSEs, respectively. The clock signal frequency for either the SEs or the nSEs is reduced when the corresponding sets of performance counter data indicates a comparatively lower processing workload for the SEs or for the nSEs.

20 Claims, 5 Drawing Sheets

(56) References Cited

U.S. PATENT DOCUMENTS

| | | | |
|---|---|---|---|
| 2010/0017042 A1* | 1/2010 | Lopata | G06F 1/3203 |
| | | | 700/286 |
| 2011/0050716 A1* | 3/2011 | Mantor | G06T 15/005 |
| | | | 345/581 |
| 2011/0119672 A1* | 5/2011 | Ramaraju | G06F 9/5044 |
| | | | 718/102 |
| 2012/0019542 A1* | 1/2012 | Shah | G06T 1/20 |
| | | | 345/522 |
| 2014/0215253 A1* | 7/2014 | Klassen | G06F 1/324 |
| | | | 713/340 |
| 2014/0324245 A1* | 10/2014 | Kwon | G06F 1/203 |
| | | | 700/299 |
| 2015/0178987 A1* | 6/2015 | Hurd | G06F 1/3203 |
| | | | 345/420 |
| 2016/0147249 A1* | 5/2016 | Gendler | G06F 1/04 |
| | | | 713/501 |
| 2016/0379337 A1 | 12/2016 | Tsai et al. | |
| 2017/0010946 A1* | 1/2017 | Orakwue | G06F 11/3442 |
| 2017/0011550 A1 | 1/2017 | Tsung et al. | |
| 2017/0212572 A1* | 7/2017 | Ragland | G06F 1/3243 |
| 2018/0336867 A1* | 11/2018 | Gu | G09G 5/024 |
| 2019/0129463 A1 | 5/2019 | Sadowski et al. | |
| 2019/0332138 A1 | 10/2019 | Bowles et al. | |
| 2020/0382151 A1* | 12/2020 | Pine | F16M 11/04 |

\* cited by examiner

SEPARATE CLOCKING FOR COMPONENTS OF A GRAPHICS PROCESSING UNIT

CROSS-REFERENCE TO RELATED APPLICATIONS

The present application claims priority to Provisional Patent Application Ser. No. 62/985,985, entitled "CLOCK CONTROL SCHEMES FOR A GRAPHICS PROCESSING UNIT" and filed on Mar. 6, 2020, and Provisional Patent Application Ser. No. 63/050,527, entitled "CLOCK CONTROL SCHEMES FOR A GRAPHICS PROCESSING UNIT" and filed on Jul. 10, 2020, the entirety of which are incorporated by reference herein.

BACKGROUND

Computer processing systems generally employ a graphics processing unit (GPU) to perform graphics operations, such as texture mapping, rendering, vertex translation, and the like. The performance requirements or specifications for the GPU can vary depending on the type of associated electronic device. For example, a GPU of a mobile device has characteristics and requirements that can diverge significantly from other platforms. Performance, battery life, and thermals are generally important metrics for mobile device platforms, with better sustained performance and low idle power consumption being desirable. Clocking of GPU components, in connection with both frequency and voltage scaling of the GPU components during device operation, impacts each of these operational aspects of a mobile device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
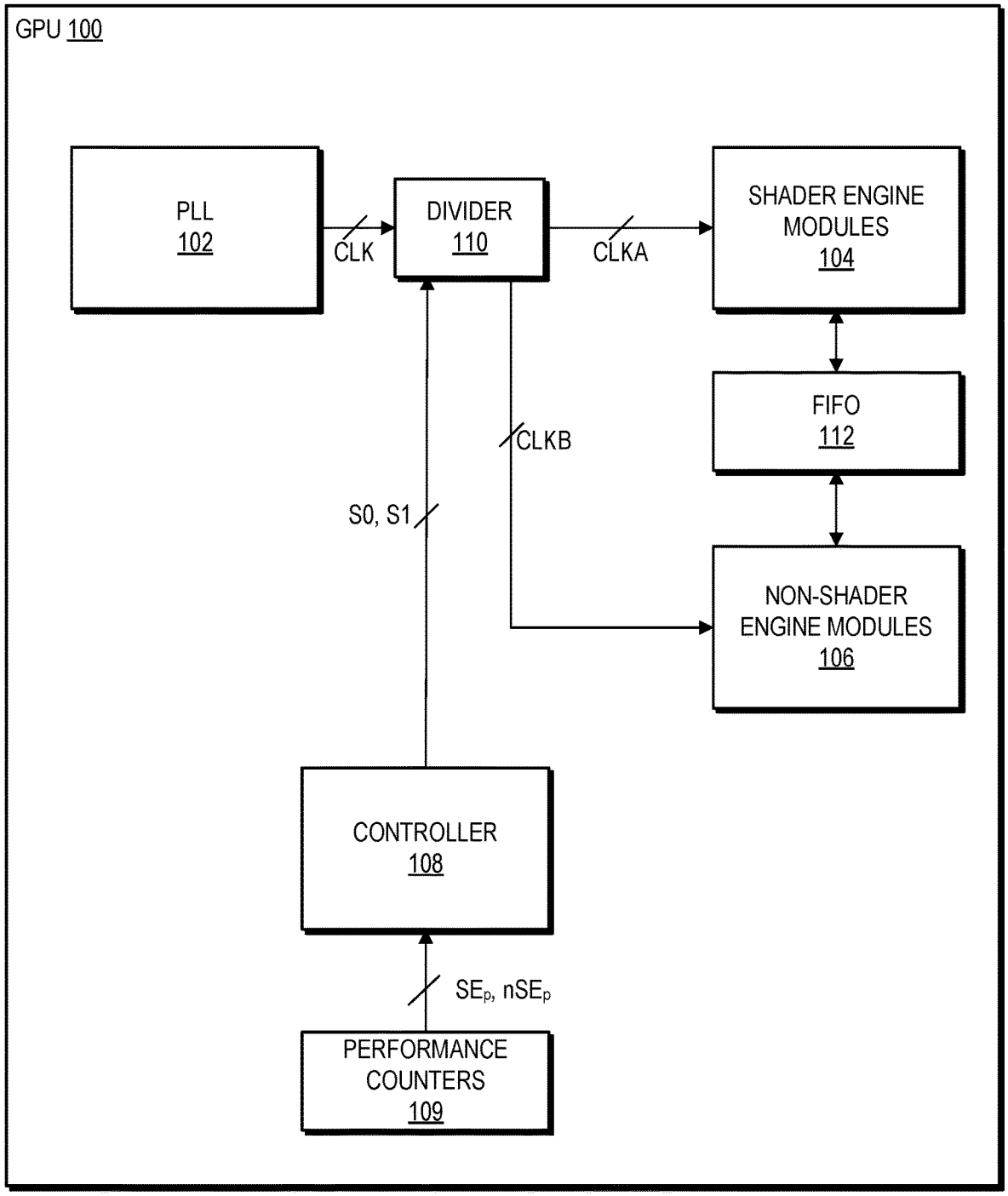
FIG. 1 is a block diagram illustrating a graphics processing unit (GPU) that includes a divider for selectively adjusting the frequencies of clock signals used to clock shader engine modules (SEs) and non-shader-engine modules (nSEs) of the GPU in accordance with some embodiments.

Processing workloads within a mobile device vary widely, from being shader heavy, to being memory bound, to being sporadically loaded (i.e., when workload intensity is changing from being memory intensive to being shader intensive, and vice-versa). Conventional single/universal clocking schemes in which a single clock signal is used to clock all components within a system limit device performance across such varied processing workload states, as these schemes do not allow for clock frequency differentiation between various system components based on respective workloads. Using the techniques described herein, variations in processing workload that disproportionately affect certain groups of device components are accounted for by providing separate clocking for different groups of components within a GPU, thereby enabling the frequency of clock signals used to clock a group of components having a light processing workload to be reduced while the frequency of clock signals used to clock a group of components having a comparatively heavy processing workload to be increased or to remain unchanged. By reducing the clocking frequency of components having lighter workloads, power and thermal efficiencies of the system that includes the components are improved over those of single/universal clocking schemes.

Two groups of device components for which unbalanced processing workloads are typical are the shader engine modules and non-shader-engine modules of a graphics processing unit (GPU). Herein, a "shader engine module" typically refers to a module of a GPU that is part of a shader engine and is used to execute specified tasks that are frequently repeated for the generation and manipulation of graphical objects. In some embodiments, such tasks include texture mapping, rendering, vertex translation, and the like. Herein, the "non-shader-engine modules" of a GPU refer to circuitry and modules that are not included in the shader engines of the GPU.

For example, shader engine modules of a GPU in a mobile device are more active than non-shader-engine modules when the GPU is handling a shader-heavy processing workload. Accordingly, with a universal clocking scheme, increasing the frequency of the clock signal for the shader engine modules to better handle a shader-heavy processing workload would also unnecessarily increase the frequency at which the non-shader-engine modules are clocked, resulting in non-optimal thermal and power performance. In contrast, by clocking the shader engine modules and non-shader-engine modules of a GPU with separately controllable clock signals, the non-shader-engine modules are clocked at a lower frequency during a shader-heavy processing workload, while the clocking frequency of the shader engine modules is increased or remains unchanged, resulting in improved thermal and power performance.

In some embodiments, similar techniques are applied to selectively set the different clock frequencies for memory bound processing workloads that require significantly more activity from the non-shader-engine modules than from the shader engine modules. When implementing a universal clocking scheme, increasing the frequency of the clock signal for the non-shader-engine modules to better handle a memory-heavy processing workload (e.g., a processing workload involving significantly more activity at non-shader-engine memory devices of the GPU than at the shader engine modules of the GPU) would also unnecessarily increase the frequency at which the shader-engines are clocked, resulting in non-optimal thermal and power performance. In contrast, by clocking the shader engine modules and non-shader-engine modules of a GPU with separately controllable clock signals, the shader-engine components are clocked at a lower frequency during a memory-heavy processing workload, while the clocking frequency of the non-shader-engine modules is increased or remains unchanged, resulting in improved thermal and power performance.

The GPU employs one or more programmable dividers to set the frequency of each independently controllable clock signal provided to different groups of components of the GPU. For example, in some embodiments a divider is interposed between a clock source, such as a phase locked loop (PLL), and the shader engine modules and non-shader-engine modules. Each divider receive a clock signal (sometimes referred to as an "input clock signal" CLK) from the clock source and outputs first and second clock signals with independently selectable frequencies, with the first clock signal being output to the shader engine modules and the second clock signal being output to the non-shader-engine modules. The divider receives control signals from a controller that set the frequencies of the first and second clock signals. The controller selects the values of the control signals based on sets of performance counter data indicative of the relative workload at the shader engine modules and at the non-shader-engine modules, respectively. For example, if the performance counter data indicates a heavier processing workload at the shader engine modules for longer than a predefined time period, the frequency of the second clock signal is decreased to reduce the rate at which the non-shader-engine modules are clocked. For example, if the performance counter data indicates a heavier processing workload at the non-shader-engine modules for longer than a predefined time period, the frequency of the first clock signal is decreased to reduce the rate at which the shader engine modules are clocked. For example, if the performance counter data indicates that a differential between the processing workloads of the shader engine modules and the non-shader-engine modules is within a defined range (sometimes referred to herein as a "guardband"), the first clock signal and the second clock signal are set to the same frequency (e.g., the frequency of the input clock signal).

FIG. 1 shows an illustrative GPU 100 having different groups of components, shader engine modules (SEs) and non-shader-engine modules (nSEs), that are clocked with respectively different configurable clock signals.

In some embodiments, the GPU 100 is included in a processing system that includes at least one central processing unit (CPU), memory device, and storage device, such as an embedded system, mobile device, personal computer, server, workstation, or game console. The GPU 100 is a specialized electronic device that is configured to perform, at a high frequency, mathematical calculations for the purpose of rendering images to be displayed at an electronic screen coupled to the processing system.

Because the hardware components within a GPU are designed for the specific purpose of performing the mathematical calculations required for image rendering, GPUs tend to perform graphics processing tasks with greater speed and efficiency than CPUs, which are generally designed to handle general-purpose calculations. In a conventional GPU, all components of the system are clocked using a single, universal clock signal. In one example, a conventional GPU includes a clock source, a controller, SEs, and nSEs. The controller of the conventional GPU controls the clock source directly to adjust the frequency of a clock signal output by the clock source. The clock signal is the only clock signal used to clock both the SEs and the nSEs of the conventional GPU. The clock signal of the conventional GPU is distributed to the SEs and the nSEs through an H-tree or mesh clock distribution network, which ensures that the routing of the clock signal occurs with equal propagation delay to each component of the SEs and the nSEs, which creates a synchronous timing relationship between the SEs and nSEs of the conventional GPU. However, due to the use of a single, universal clock signal to clock both the SEs and the nSEs, dynamic frequency scaling cannot be performed between the SEs and the nSEs based on their respective workloads, which creates thermal and power consumption inefficiencies. In contrast, the GPU 100 includes SEs and nSEs that are clocked with separately controllable clock signals that are output by a divider, which allows dynamic frequency scaling to be performed between the SEs and nSEs based on their respective workloads, which improves thermal efficiency and power consumption efficiency compared to conventional GPUs with universal clocking schemes.

The GPU 100 includes a phased lock loop (PLL) module 102, SEs 104, nSEs 106, a controller 108, performance counters 109, a divider 110, and a first-in-first-out (FIFO) memory module 112. In the GPU 100, all of the SEs 104 are clocked using a first clock signal CLKA, and all of the nSEs 106 are clocked using a second clock signal CLKB, such that clock frequency scaling is able to be implemented between the SEs 104 and the nSEs 106. In some embodiments, each of the SEs 104 includes, for example, a geometry processor, a primitive unit, multiple compute units, rasterizers, and render output units (ROPs), and an L1 cache. In some embodiments, the nSEs 106 include a command processor, a shader resource arbiter, dispatch controllers, and memory resources such as an L1 cache, L2 cache, and ring buffer. The FIFO memory module 112 passes data between the SEs 104 and the nSEs 106. Because the phase relationship between the SEs 104 and the nSEs 106 is known, the FIFO memory module 112 does not need to synchronize data transmission between the clock domain of the SEs 104 and the clock domain of the nSEs 106, and therefore does not require a synchronizer.

The PLL module 102 generates and outputs a clock signal CLK having a specified frequency to an input of the divider 110. The divider 110 that receives the clock signal CLK and outputs clock signals CLKA and CLKB to clock the SEs 104 and to the nSEs 106, respectively. The respective frequencies of CLKA and CLKB are set based on control signals S0 and S1 that are output by the controller 108 to the divider 110. The frequencies of CLKA and CLKB are set based on the specified frequency of the clock signal CLK. For example, in some embodiments, CLKA and CLKB are each individually set to either the frequency of CLK or the frequency of CLK/2 by the divider 110, responsive to the control signals S0 and S1. In some embodiments, each control signal S0 and S1 carries multiple bits of control data and multiple flip-flops are included in the divider 110, allowing for one of more than two clock frequencies (e.g., CLK, CLK/2, CLK/4, CLK/8, etc.) to be selected for CLKA and CLKB. Thus, the divider 110 allows the SEs 104 and the nSEs 106 to be selectively clocked with clock signals of the same frequency or different frequencies.

In some embodiments, the controller 108 is configured to determine the ratio of frequencies between CLKA and CLKB to be output by the divider 110 based on respective sets of performance counter data obtained from performance counters associated with the SEs 104 and the nSEs 106. The controller 108 receives performance counter data, $SE_p$ and $nSE_p$, from performance counters 109 and sets the values of the control signals S0 and S1 based on the performance counter data. In some embodiments, each performance counter 109 is a register implemented in hardware or software that stores performance counter data, including performance counter values corresponding to one or more events that occur in the GPU 100. In some embodiments, utilization counters, active capacitance ($C_{ac}$) busy signals, or streaming performance counters are additionally or alternatively used to identify and quantify activity occurring in the SEs 104. In one example, a first set of performance counters coupled to the controller 108 generates and stores first performance counter data, $SE_p$, indicative of activity in the SEs 104. In some embodiments, the first performance counter data, $SE_p$, includes or is a sum of performance counter values received from the first set of performance counters, and the first set of performance counters track respective quantities of specific events occurring at the SEs 104. In some embodiments, the SEs 104 include a ring buffer (RB) and an L1 cache. In some embodiments, the performance counters and corresponding performance counter data, $SE_p$, includes or is otherwise indicative of vector and scalar arithmetic logic unit (ALU) activity, a pixel rate, an L1 cache hit rate, and/or shader memory access rate. For example, a second set of performance counters coupled to the controller 108 generates and stores second performance counter data, $nSE_p$, indicative of activity in one or more of the nSEs 106. In some embodiments, the second performance counter data, $nSE_p$, includes or is a sum of performance counter values received from the second set of performance counters, where the second set of performance counters track respective quantities of specific events occurring at one or more non-shader components such as a command processor, a shader resource arbiter, dispatch controllers, and memory resources such as an L2 cache. In some embodiments, the performance counters and corresponding performance counter data, nSEp, includes or is otherwise indicative of a vertex rate, a primitive rate, and/or an L2 cache access rate. The controller 108 calculates a differential, $SE_p$-$nSE_p$, between the first performance counter data and the second performance counter data. In some embodiments, rather than using the raw differential, $SE_p$-$nSE_p$, hysteresis is used to filter the calculated differential values over time in order to avoid switching clock signals based on transient glitches. The controller 108 periodically updates (i.e., recalculates) the value of the differential, and selects the values of the control signals S0 and S1 based on the value of the differential over time. For example, if the controller 108 determines that the differential is within a predefined range of values between an upper threshold and a lower threshold, referred to herein as a guardband, the controller 108 selects values of S0 and S1 that cause CLKA and CLKB to have a 1:1 clock ratio (i.e., the frequency of CLKA equals the frequency of CLKB). In some embodiments, the range of differential values that defines the guardband is selected based on switching latency or a time required to enforce a change in clocking frequency. If the controller 108 determines that the differential is higher than the upper threshold of the guardband for longer than a predefined continuous time period, generally indicating a shader-heavy workload is being processed by the GPU 100, the controller 108 selects values of S0 and S1 that cause CLKA to have a higher frequency than CLKB (e.g., setting the frequency of CLKA to that of CLK, and the frequency of CLKB to that of CLK/2). In this way, clocking of the SEs 104 is scaled back (i.e., reduced in frequency) when the workload of the GPU 100 involves comparatively high non-shader-engine (e.g., memory) activity, while clocking of the nSEs 106 is scaled back (i.e., reduced in frequency) when the workload of the GPU 100 involves comparatively high shader activity, thereby reducing power consumption in the GPU 100 compared to implementations in which a single, universal clock is used for both SEs and nSEs.

In some embodiments, the GPU 100 includes multiple shader engines, each having respective shader engine modules. In some embodiments, the shader engine modules included in a given shader engine of the GPU 100 are replicated or cloned across all shader engines of the GPU. In such embodiments, asymmetric workloads are able to be assigned to each shader engine, and the clock frequency scaling methods described herein are applied according to a global scheme, such that the clock frequencies of the clock signals supplied to the shader engine modules of each respective shader engine in the GPU 100 are individually selectable. In other embodiments, the shader engines of the GPU 100 are assigned symmetric workloads and are all clocked using the same clocking frequency in accordance with the clock frequency scaling methods described herein.

Figure 2:
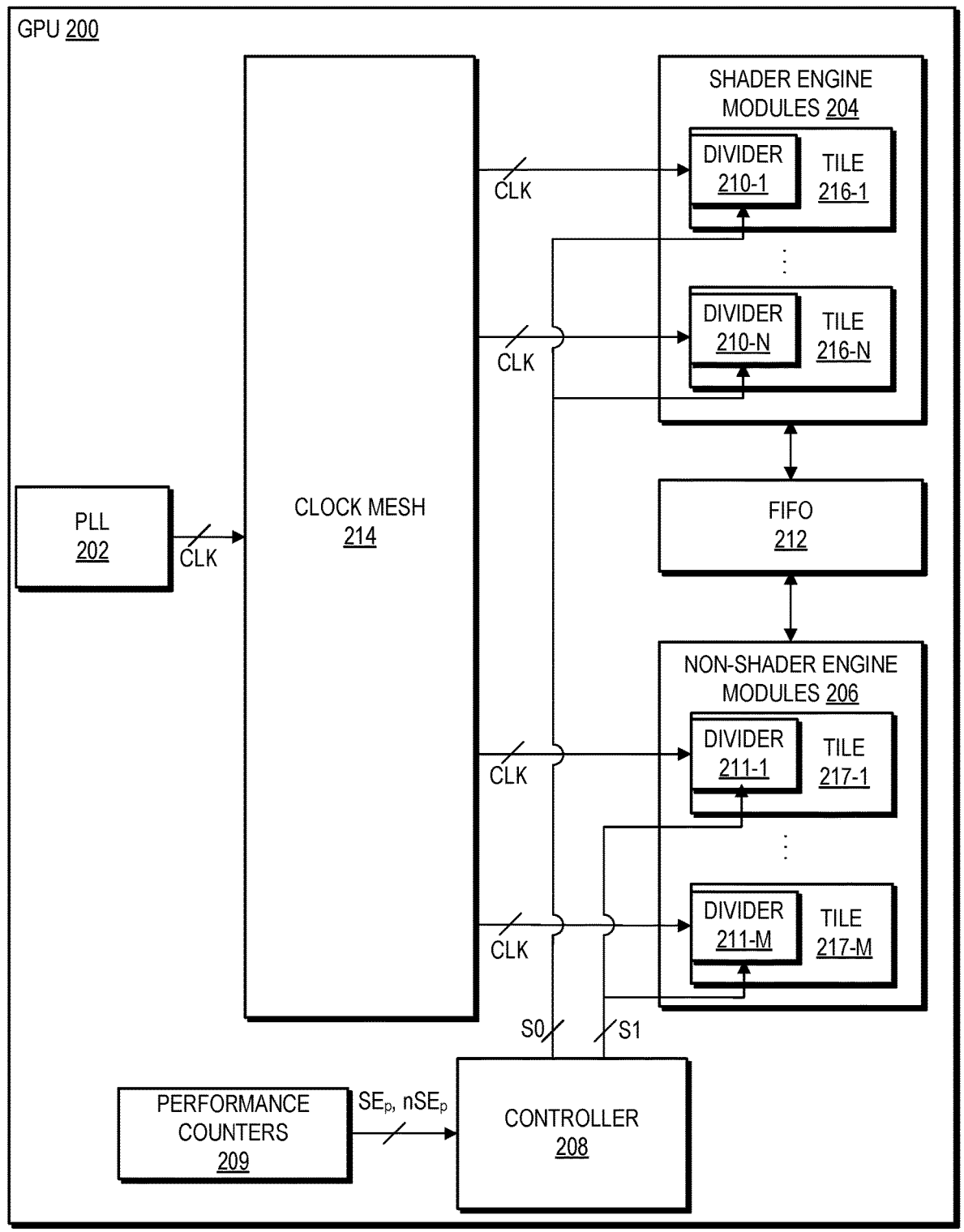
FIG. 2 is a block diagram illustrating a GPU that includes multiple dividers disposed at individual files of SEs and nSEs of the GPU for selectively adjusting the frequencies of clock signals used to clock the SEs and nSEs in accordance with some embodiments.

FIG. 2 shows an illustrative GPU 200 in which clock frequency scaling is implemented between SEs and the nSEs via dividers that are disposed on each tile of the SEs and nSEs. The GPU 200 includes a phased lock loop (PLL) module 202, SEs 204, nSEs 206, a controller 208, performance counters 209, a FIFO memory module 212, and a clock mesh 214. In some embodiments, each of the SEs 204 includes, for example, a geometry processor, a primitive unit, multiple compute units, rasterizers, and render output units (ROPs), a ring buffer (RB), and an L1 cache. In some embodiments, the nSEs 206 include a command processor, a shader resource arbiter, dispatch controllers, and memory resources such as an L2 cache.

The SEs 204 are implemented on a quantity, N, of tiles 216, where each tile 216 includes a respective divider 210. Here, a "tile" refers to a spatially coherent group of processing and/or memory elements (e.g., compute units, memory cells, and the like), where elements of the SEs 204 and the nSEs 206 are partitioned into such tiles in the present example. The nSEs 206 are implemented on a quantity, M, of tiles 217, where each tile 217 includes a respective divider 211. In some embodiments, each of the dividers 210 and the dividers 211 corresponds to the divider 310 of FIG. 3, but are modified to include only a single clock signal output and, optionally, to include additional flip flops for additional selectable clock divisions.

The PLL module 202 generates and outputs a clock signal CLK to an input of the clock mesh 214. The clock mesh 214 distributes the clock signal CLK to multiple outputs, each respectively coupled to a clock input of a respective divider 210 or divider 211. The dividers 210 and 211 each receive the clock signal CLK and that output a clock signal having a selected frequency, which is selected from frequencies of CLK, CLK/2, CLK/4, or another desired division of the frequency of CLK, to clock the SEs 204 and to the nSEs 206 at their corresponding tiles 216 and 217, respectively. In the present example, all dividers 210 output the same clock signal, CLKA, while all dividers 211 output the same clock signal CLKB, where CLKA and CLKB will have the same frequency or different frequencies, depending on the values of the control signals S0 and S1 output by the controller 208. For example, the frequency CLKA is independently controllable from the frequency of the CLKB. For example, the clock signal frequency of CLKA is selected based on the control signal S0 output by the controller 208 to the dividers 210, and the clock signal frequency for CLKB is selected based on the control signal S1 output by the controller 208 to the dividers 211. In some embodiments, each control signal S0 and S1 carries multiple bits of control data and multiple flip-flops are included in the each of the dividers 210 and 211, allowing for one of more than two clock frequencies (e.g., CLK, CLK/2, CLK/4, CLK/8, etc.) to be selected for clocking the SEs 204 and the nSEs 206. Thus, the dividers 210 and dividers 211 allow the SEs 204 and the nSEs 206 to be selectively clocked with clock signals of the same frequency or different frequencies.

In some embodiments, the controller 208 is configured to determine the ratio of frequencies between CLKA and CLKB to be output by the dividers 210 and dividers 211, respectively, based on respective sets of performance counter data obtained from performance counters associated with the SEs 204 and the nSEs 206. The controller 208 receives first performance counter data, $SE_p$, and second performance counter data, $nSE_p$, from first and second sets of performance counters of the performance counters 209 and sets the values of the control signals S0 and S1 based on the performance counter data, as described in connection with FIG. 1, above. The controller 208 calculates a differential, $SE_p$-$nSE_p$, between the first performance counter data and the second performance counter data. The controller 208 periodically updates (i.e., recalculates) the value of the differential, and selects the values of the control signals S0 and S1 based on the value of the differential over time. For example, if the controller 208 determines that the differential is within the predefined guardband, the controller 208 selects values of S0 and S1 that cause CLKA and CLKB to have a 1:1 clock ratio (i.e., the frequency of CLKA equals the frequency of CLKB). If the controller 208 determines that the differential is higher than the upper threshold of the guardband for longer than a predefined continuous time period, generally indicating a shader-heavy workload is being processed by the GPU 200, the controller 208 selects values of S0 and S1 that cause CLKA to have a higher frequency than CLKB (e.g., setting the frequency of CLKA to that of CLK, and the frequency of CLKB to that of CLK/2). In this way, clocking of the SEs 204 is scaled back (i.e., reduced in frequency) when the workload of the GPU 200 involves comparatively high non-shader-engine (e.g., memory) activity, while clocking of the nSEs 206 is scaled back (i.e., reduced in frequency) when the workload of the GPU 200 involves comparatively high shader activity, thereby reducing power consumption in the GPU 200 compared to implementations in which a single, universal clock is used for both SEs and nSEs. When compared to the GPU 100 of FIG. 1, the GPU 200 will generally having increased latency for clock frequency changes due to the distance between the dividers 210, 211 and the controller 208, which is offset by the comparatively lower clock tree divergence of the GPU 200.

Figure 3:
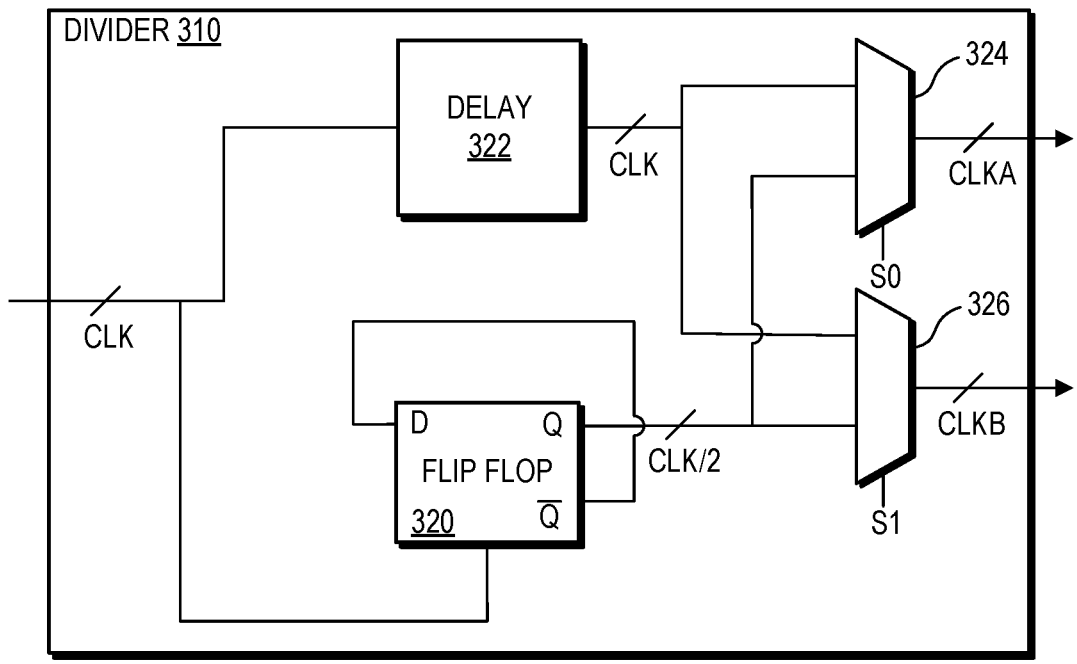
FIG. 3 is a block diagram illustrating a clock divider usable in the GPUs of FIG. 1 in accordance with some embodiments.

FIG. 3 depicts an illustrative block diagram of a divider 310. In some embodiments, the divider 310 corresponds in whole or in part to one or more of the divider 110 of FIG. 1, and the dividers 210 and 211 of FIG. 2. As illustrated, the divider 310 includes a delay circuit 322, a flip flop 320, a first multiplexer 324, and a second multiplexer 326. The divider 310 receives a clock signal CLK at a clock input. The clock signal CLK is then received by the delay circuit 322 and the flip flop 320. The flip flop 320 halves the frequency of the clock signal CLK to produce a clock signal CLK/2. The delay circuit 322 provides an amount of delay to the clock signal CLK that is equal to the delay introduced to the clock signal CLK by the flip flop 320 to produce the clock signal CLK/2, such that the clock signal CLK output by the delay circuit 322 is synchronized with the clock signal CLK/2 output by the flip flop 320. The first multiplexer 324 receives the delayed clock signal CLK, the clock signal CLK/2, and a control signal S0. The first multiplexer 324 outputs a clock signal CLKA that is a selected one of the delayed clock signal CLK and the clock signal CLK/2, selected based on the control signal S0. The second multiplexer 326 receives the delayed clock signal CLK, the clock signal CLK/2, and a control signal S1. The second multiplexer 326 outputs a clock signal CLKB that is a selected one of the delayed clock signal CLK and the clock signal CLK/2, selected based on the control signal S1. The multiplexers 324 and 326 receive the control signals S0 and S1, respectively, from an external controller. In some embodiments, the external controller corresponds to either of the controllers 108 and 208 of FIGS. 1 and 2.

Figure 4:
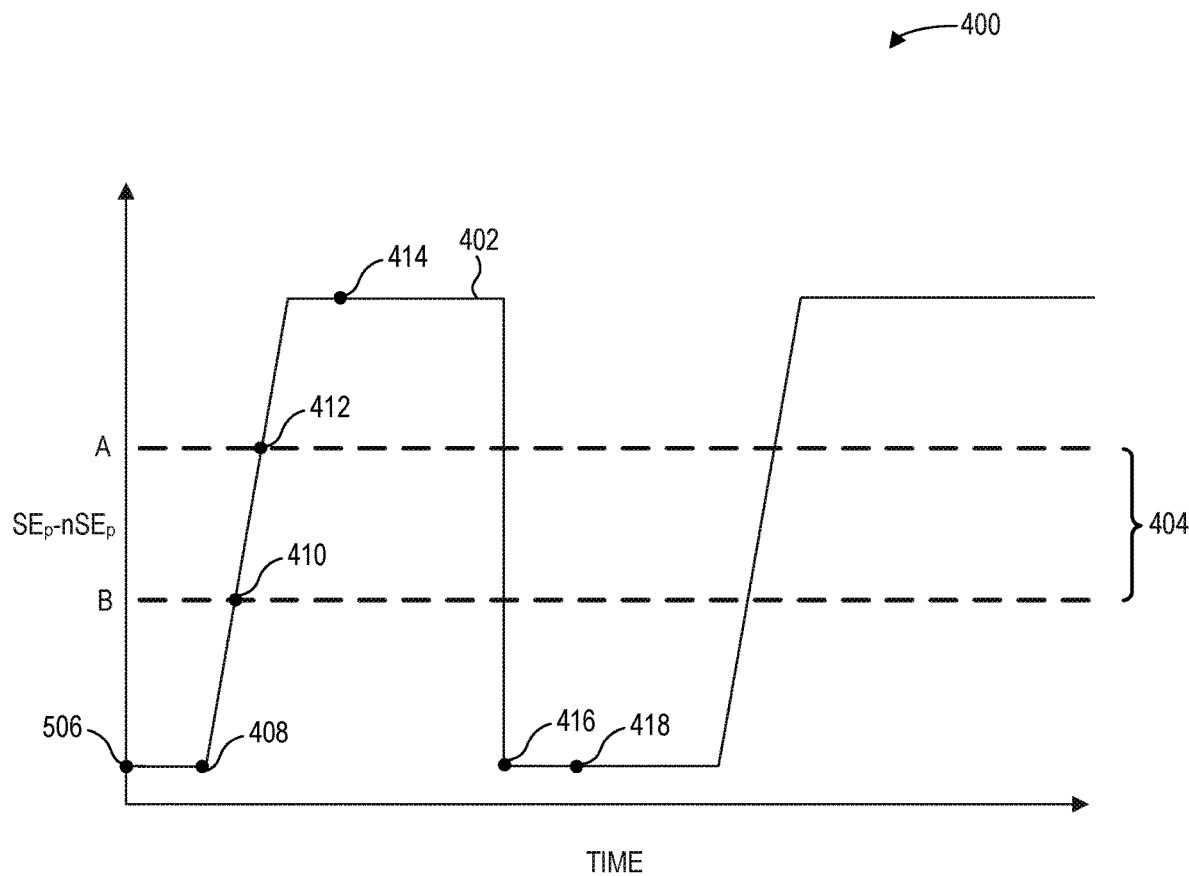
FIG. 4 is an illustrative graph depicting an example of a differential between SE performance counter data and nSE performance counter data over time in accordance with some embodiments.

FIG. 4 depicts a graph 400 illustrating an example of how the differential 402 between first and second performance counter data, $SE_p$-$nSE_p$, as described above, changes over time with respect to the upper threshold A and lower threshold B of a predefined guardband 404. The graph 400 is described with respect to an example implementation of the GPU 100 of FIG. 1, though it is also applicable to the GPU 200 of FIG. 2.

Beginning at point 406, the controller 108 calculates the differential $SE_p$-$nSE_p$ based on the performance counter data $SE_p$ and $nSE_p$ is provided to the controller 108 by the performance counters 109. In some embodiments, the controller 108 calculates the differential 402 periodically, such that the calculated value of the differential 402 is regularly updated by the controller 108. In some embodiments, the controller 108 recalculates the differential 402 each time new performance counter data $SE_p$ and $nSE_p$ is provided to the controller 108 by the performance counters 109. In the present example, it is assumed that the frequencies of CLKA and CLKB output by the divider 110 are equal at point 406.

At point 408, the controller 108 determines that the differential 402 has been less than the lower threshold B of the guardband 404 for longer than a predefined time period, indicating that a majority of the workload being handled by the graphics processing unit 100 is being performed by the nSEs 106 for longer than the predefined time period. In response to determining that the differential 402 has been less than the lower threshold B for longer than a predefined time period, the controller 108 modifies the control signal S1 to decrease the frequency of the clock signal CLKB, used to clock the nSEs 106, to a lower frequency, such as CLK/2.

At point 410, the controller 108 determines that the differential 402 has crossed above the lower threshold B, indicating a more balanced workload between the nSEs 106 and the SEs 104. In response to determining that the differential 402 has crossed above the lower threshold B, the controller 108 modifies the control signal S1 to increase the frequency of the clock signal CLKB to be equal to that of the clock signal CLKA, used to clock the SEs 104.

At point 412, the controller 108 determines that the differential 402 has crossed above the upper threshold A of the guardband 404, indicating that the majority of the workload being handled by the GPU 100 is being performed by the SEs 104.

At point 414, the controller 108 determines that the differential 402 has remained above the upper threshold A for longer than the predefined time period. In response to determining that the differential 402 has remained above the upper threshold A of the guardband 404 for longer than the predefined time period, the controller 108 modifies the control signal S0 to decrease the frequency of the clock signal CLKA to a lower frequency, such as CLK/2.

At point 416, the controller 108 determines that the differential 402 has dropped from being higher than the upper threshold A to being lower than the lower threshold B, indicating that the processing workload has shifted suddenly from being primarily handled by the SEs 104 to being primarily handled by the nSEs 106. In response to determining that the differential 402 has dropped from being higher than the upper threshold A to being lower than the lower threshold B, the controller 108 modifies the control signal S0 to increase the frequency of CLKA to match the frequency of CLKB.

At point 418, the controller 108 determines that the differential 402 has remained below the lower threshold B for more than the predetermined time period. In response, the controller modifies the control signal S1 to decrease the frequency of CLKB.

Figure 5:
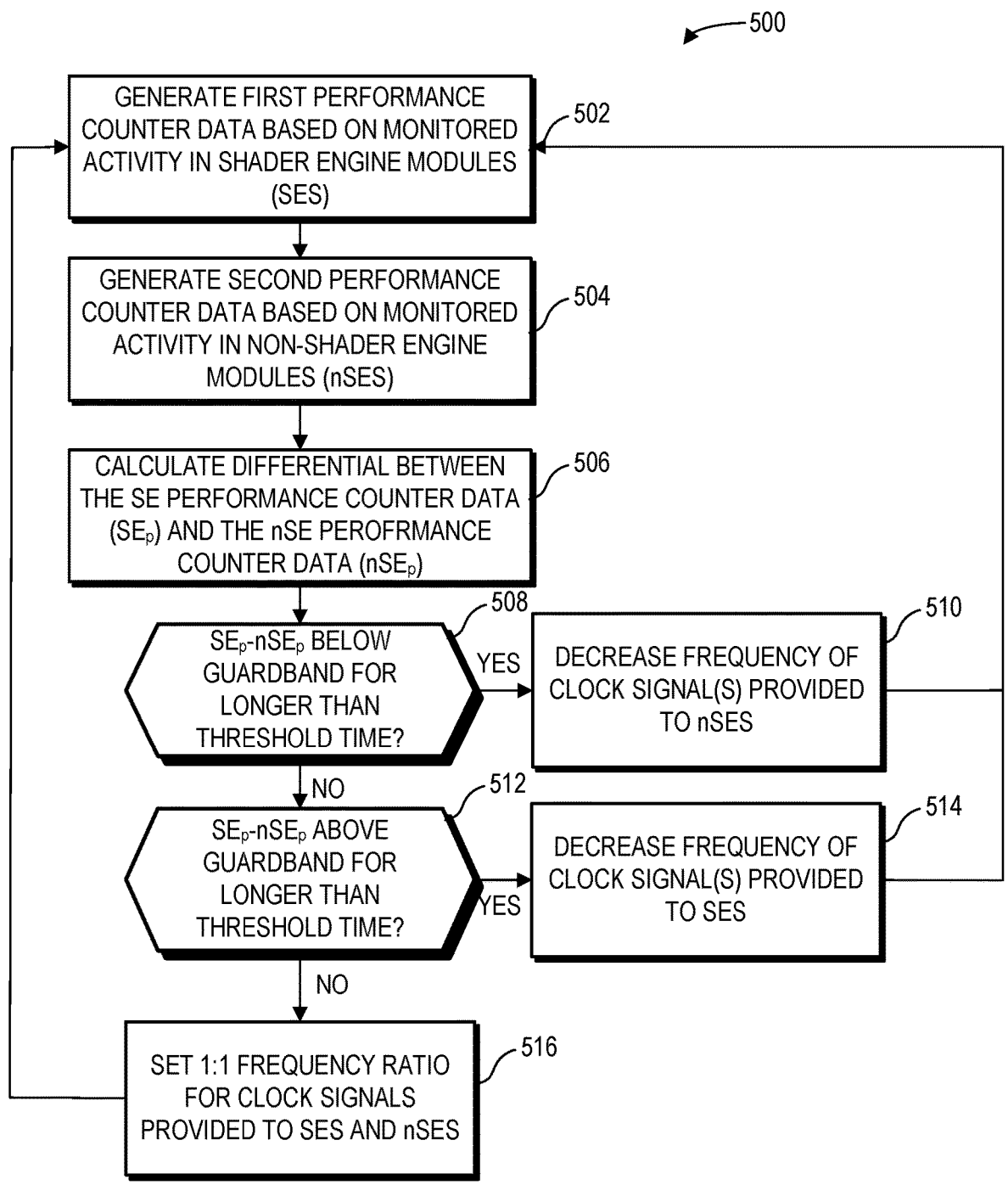
FIG. 5 is a flow diagram illustrating a method for adjusting the frequencies of clock signals used to clock SEs and nSEs based on corresponding performance counter data in accordance with some embodiments.

FIG. 5 depicts an illustrative process flow for a method 500 of selectively modifying clock signals supplied to SEs and nSEs of a GPU, in accordance with some embodiments. The method 500 is described with respect to an example implementation at the GPU 100 of FIG. 1 and its constituent components.

At block 502, a first set of the performance counters 109 generates first performance counter data, $SE_p$, based on monitored activity in the SEs 104. In some embodiments, the first performance counter data, $SE_p$, includes or is indicative of scalar and vector ALU activity, pixel rate, L1 cache hit rate, and/or shader memory access rate.

At block 504, a second set of the performance counters 109 generates second performance counter, $nSE_p$, data based on monitored activity in the nSEs 106. In some embodiments, the second performance counter data, $SE_p$, includes or is indicative of a vertex rate, primitive rate, and/or L2 cache access rate.

At block 506, the controller 108 calculates a differential, $SE_p$-$nSE_p$, between the SE performance counter data, $SE_p$, and the nSE performance counter data, $nSE_p$. In some embodiments, $SE_p$ is a sum of multiple performance counter values corresponding to counts for various respectively defined events occurring at the SEs 104 and $nSE_p$ is a sum of multiple performance counter values corresponding to counts for various respectively defined events occurring at the nSEs 106. Accordingly, the differential, $SE_p$-$nSE_p$, represents a difference in processing workloads between the SEs 104 and the nSEs 106.

At block 508, the controller 108 determines whether $SE_p$-$nSE_p$ has remained below the lower threshold of a predefined guardband for longer than a predefined threshold time period. If $SE_p$-$nSE_p$ remains below the lower threshold for longer than the predefined time period, the method 500 proceeds to block 510. If $SE_p$-$nSE_p$ is above the lower threshold or has not remained below the lower threshold for longer than the predefined time period, the method 500 proceeds to block 512.

At block 510, the controller 108 decreases the frequency of one or more clock signals provided to the nSEs 106. In some embodiments, in order to decrease the frequency of the clock signals provided to the nSEs 106, the controller 108 modifies the control signal S1 to cause the divider 110 to output a clock signal with a lower frequency. In some embodiments, such a modification of the clock signal S1 causes the frequency of the clock signal CLKB output by the divider 110 to change from the frequency of the clock signal CLK received at the clock signal input of the divider 110 to half of that frequency (i.e., CLK/2).

At block 512, the controller 108 determines whether $SE_p$-$nSE_p$ has remained above the upper threshold of a predefined guardband for longer than a predefined threshold time period. If $SE_p$-$nSE_p$ remains above the upper threshold for longer than the predefined time period, the method 500 proceeds to block 514. If $SE_p$-$nSE_p$ is below the upper threshold or has not remained above the upper threshold for longer than the predefined time period, the method 500 proceeds to block 516. In some embodiments, the predefined threshold time period associated with the upper threshold of the guardband is the same as the predefined threshold time period associated with the lower threshold of the guardband, while in other embodiments these predefined threshold time periods are different.

At block 514, the controller 108 decreases the frequency of one or more clock signals provided to the SE components 104. In some embodiments, in order to decrease the frequency of the clock signals provided to the SE components 104, the controller 108 modifies the control signal S0 to cause the divider 110 to output a clock signal with a lower frequency. In some embodiments, such a modification of the clock signal S0 causes the frequency of the clock signal CLKA output by the divider 110 to change from the frequency of the clock signal CLK received at the clock signal input of the divider 110 to half of that frequency (i.e., CLK/2).

At block 516, the controller 108 sets a 1:1 frequency ratio for the clock signals provided to the SEs 104 and the nSEs 106. In some embodiments, the controller 108 modifies one or both of the control signals S0 and S1 to change the frequencies of the clock signals CLKA and CLKB output by the divider 110 to the SEs 104 and the nSEs 106, respectively, to be the same frequency. In some embodiments, the controller 108 modifies the control signals S0 and S1 such that the frequencies of clock signals CLKA and CLKB are equal to the frequency of the clock signal CLK that is input to the divider 110 by the PLL 102.

While the method 500 has been described in the context of the GPU 100 of FIG. 1, it will be understood by a person of ordinary skill that the method 500 is also applicable to the GPU 200 of FIG. 2.

In some embodiments, the apparatus and techniques described above are implemented in a system including one or more integrated circuit (IC) devices (also referred to as integrated circuit packages or microchips), such as the GPUs described above with reference to FIGS. 1 and 2. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the processing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the processing system (e.g., system RAM or ROM), fixedly attached to the processing system (e.g., a magnetic hard drive), removably attached to the processing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    independently adjusting at least one of a first frequency of a first clock signal received by one or more shader engine modules and a second frequency of a second clock signal received by one or more non-shader-engine modules of a graphics processing unit based on a quantity of events associated with a first workload of the one or more shader engine modules and a quantity of events associated with a second workload of the one or more non-shader-engine modules.

2. The method of claim 1, wherein independently adjusting the at least one of the first frequency and the second frequency is based on first performance counter data indicative of the first workload and second performance counter data indicative of the second workload, the method further comprising:
    calculating a differential between the first performance counter data and the second performance counter data, wherein independently adjusting the at least one of the first frequency and the second frequency is performed based on the differential.

3. The method of claim 1, wherein independently adjusting the at least one of the first frequency and the second frequency comprises:
    sending at least one control signal to a divider;
    with the divider, sending the first clock signal with the first frequency to the one or more shader engine modules based on the at least one control signal; and
    with the divider, sending the second clock signal with the second frequency to the one or more non-shader-engine modules based on the at least one control signal.

4. The method of claim 1, wherein independently adjusting the at least one of the first frequency and the second frequency comprises:
    sending a first control signal to a first plurality of dividers;
    sending a second control signal to a second plurality of dividers;
    with the first plurality of dividers, sending the first clock signal with the first frequency to the one or more shader engine modules based on the first control signal; and
    with the second plurality of dividers, sending the second clock signal with the second frequency to the one or more non-shader-engine modules based on the second control signal.

5. The method of claim 2, further comprising:
    determining that the differential is less than a lower threshold of a predefined guardband for more than a predefined time period, wherein independently adjusting the at least one of the first frequency and the second frequency comprises:
    independently adjusting the first frequency of the first clock signal without adjusting the second frequency of the second clock signal.

6. The method of claim 2, further comprising:
    determining that the differential is greater than an upper threshold of a predefined guardband for more than a predefined time period, wherein independently adjusting the at least one of the first frequency and the second frequency comprises:
    independently adjusting the second frequency of the second clock signal without adjusting the first frequency of the first clock signal.

7. The method of claim 2, wherein independently adjusting the at least one of the first frequency and the second frequency comprises:
    determining that the differential is between an upper threshold and a lower threshold of a predefined guardband, wherein independently adjusting the at least one of the first frequency and the second frequency comprises:

adjusting the first frequency of the first clock signal to match the second frequency of the second clock signal.

8. A graphics processing unit (GPU) comprising:
a divider;
a plurality of shader engine modules coupled to the divider and configured to receive a first clock signal from the divider;
a plurality of non-shader-engine modules coupled to the divider and configured to receive a second clock signal from the divider; and
a controller configured to output a first control signal and a second control signal to the divider to selectively control a first frequency of the first clock signal and a second frequency of the second clock signal based on a quantity of events associated with a first detected workload of the plurality of shader engine modules and a quantity of events associated with a second detected workload of the plurality of non-shader-engine modules.

9. The GPU of claim 8, further comprising:
a first plurality of performance counters configured to generate first performance counter data indicative of the first detected workload of the plurality of shader engine modules; and
a second plurality of performance counters configured to generate second performance counter data indicative of the second detected workload of the plurality of non-shader-engine modules.

10. The GPU of claim 9, wherein the controller is further configured to:
receive the first performance counter data from the first plurality of performance counters;
receive the second performance counter data from the second plurality of performance counters; and
independently adjust at least one of the first frequency and the second frequency based on the first performance counter data and the second performance counter data.

11. The GPU of claim 10, wherein the controller is further configured to:
calculate a differential between the first performance counter data and the second performance counter data; and
independently adjust at least one of the first frequency and the second frequency based on the differential.

12. The GPU of claim 11, wherein the controller is further configured to:
determine that the differential is less than a lower threshold of a predefined guardband for more than a predefined time period; and
independently adjust the first frequency of the first clock signal without adjusting the second frequency of the second clock signal.

13. The GPU of claim 11, wherein the controller is further configured to:
determine that the differential is greater than an upper threshold of a predefined guardband for more than a predefined time period; and
independently adjust the second frequency of the second clock signal without adjusting the first frequency of the first clock signal.

14. The GPU of claim 11, wherein the controller is further configured to:
determine that the differential is between an upper threshold and a lower threshold of a predefined guardband; and
adjust the first frequency of the first clock signal to match the second frequency of the second clock signal.

15. A graphics processing unit (GPU) comprising:
a plurality of dividers;
a plurality of shader engine modules configured to receive first clock signals, each having a first frequency, from a first subset of the plurality of dividers;
a plurality of non-shader-engine modules configured to receive second clock signal signals, each having a second frequency, from a second subset of the plurality of dividers; and
a controller configured to output a first control signal to the first subset of the plurality of dividers to selectively control the first frequency of the first clock signals and to output a second control signal to the second subset of the plurality of dividers to selectively control the second frequency of the second clock signals based on a quantity of events associated with a first detected workload of the plurality of shader engine modules and a quantity of events associated with a second detected workload of the plurality of non-shader-engine modules.

16. The GPU of claim 15, further comprising:
a first plurality of performance counters configured to generate first performance counter data indicative of the first detected workload of the plurality of shader engine modules; and
a second plurality of performance counters configured to generate second performance counter data indicative of the second detected workload of the plurality of non-shader-engine modules.

17. The GPU of claim 16, wherein the controller is further configured to:
receive the first performance counter data from the first plurality of performance counters;
receive the second performance counter data from the second plurality of performance counters;
calculate a differential between the first performance counter data and the second performance counter data; and
independently adjust at least one of the first frequency and the second frequency based on the differential.

18. The GPU of claim 17, wherein the controller is further configured to:
determine that the differential is less than a lower threshold of a predefined guardband for more than a predefined time period; and
independently adjust the first frequency without adjusting the second frequency.

19. The GPU of claim 17, wherein the controller is further configured to:
determine that the differential is greater than an upper threshold of a predefined guardband for more than a predefined time period; and
independently adjust the second frequency without adjusting the first frequency.

20. The GPU of claim 17, wherein the controller is further configured to:
determine that the differential is between an upper threshold and a lower threshold of a predefined guardband; and
adjust the first frequency to match the second frequency.

* * * * *